(12) United States Patent
Ehrlich et al.

(10) Patent No.: US 7,894,156 B2
(45) Date of Patent: Feb. 22, 2011

(54) DETERMINATION OF WEDGE OFFSET CORRECTION VALUES FOR A DISK DRIVE

(75) Inventors: Richard M. Ehrlich, Saratoga, CA (US); Anton L. Gerasimov, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/414,498

(22) Filed: Mar. 30, 2009

(65) Prior Publication Data

US 2010/0246056 A1 Sep. 30, 2010

(51) Int. Cl.
*G11B 5/596* (2006.01)
(52) U.S. Cl. .................. 360/77.04; 360/77.08
(58) Field of Classification Search ........... None
See application file for complete search history.

(56) References Cited

U.S. PATENT DOCUMENTS

| 6,141,175 | A | 10/2000 | Nazarian et al. |
| 6,310,742 | B1 | 10/2001 | Nazarian et al. |
| 6,456,452 | B1 | 9/2002 | Hobson et al. |
| 6,493,173 | B1 * | 12/2002 | Kim et al. ............. 360/77.04 |
| 6,804,079 | B2 | 10/2004 | Hsin |
| 6,831,803 | B2 | 12/2004 | Hsin |
| 7,123,433 | B1 | 10/2006 | Melrose et al. |
| 7,576,941 | B1 * | 8/2009 | Chen et al. ............. 360/77.04 |
| 2008/0239555 | A1 * | 10/2008 | Ehrlich et al. ............. 360/77.08 |
| 2009/0086364 | A1 * | 4/2009 | Gerasimov ............. 360/77.04 |

* cited by examiner

*Primary Examiner*—K. Wong
(74) *Attorney, Agent, or Firm*—Patterson & Sheridan, LLP

(57) ABSTRACT

In a disk drive, a wedge-based scheme is used to determine wedge offset correction values for a track of the disk drive. Correction values for the offset of each servo wedge are calculated wedge-by-wedge, based on the position error signal (PES) of the most recently measured servo wedge in combination with the measured PES of other servo wedges. To minimize transport delay of the servo, the majority of servo-control calculations may be pre-calculated prior to measuring the PES at the current wedge. Wedge offset correction values for a given servo wedge are corrected iteratively with each revolution of the storage disk.

20 Claims, 6 Drawing Sheets

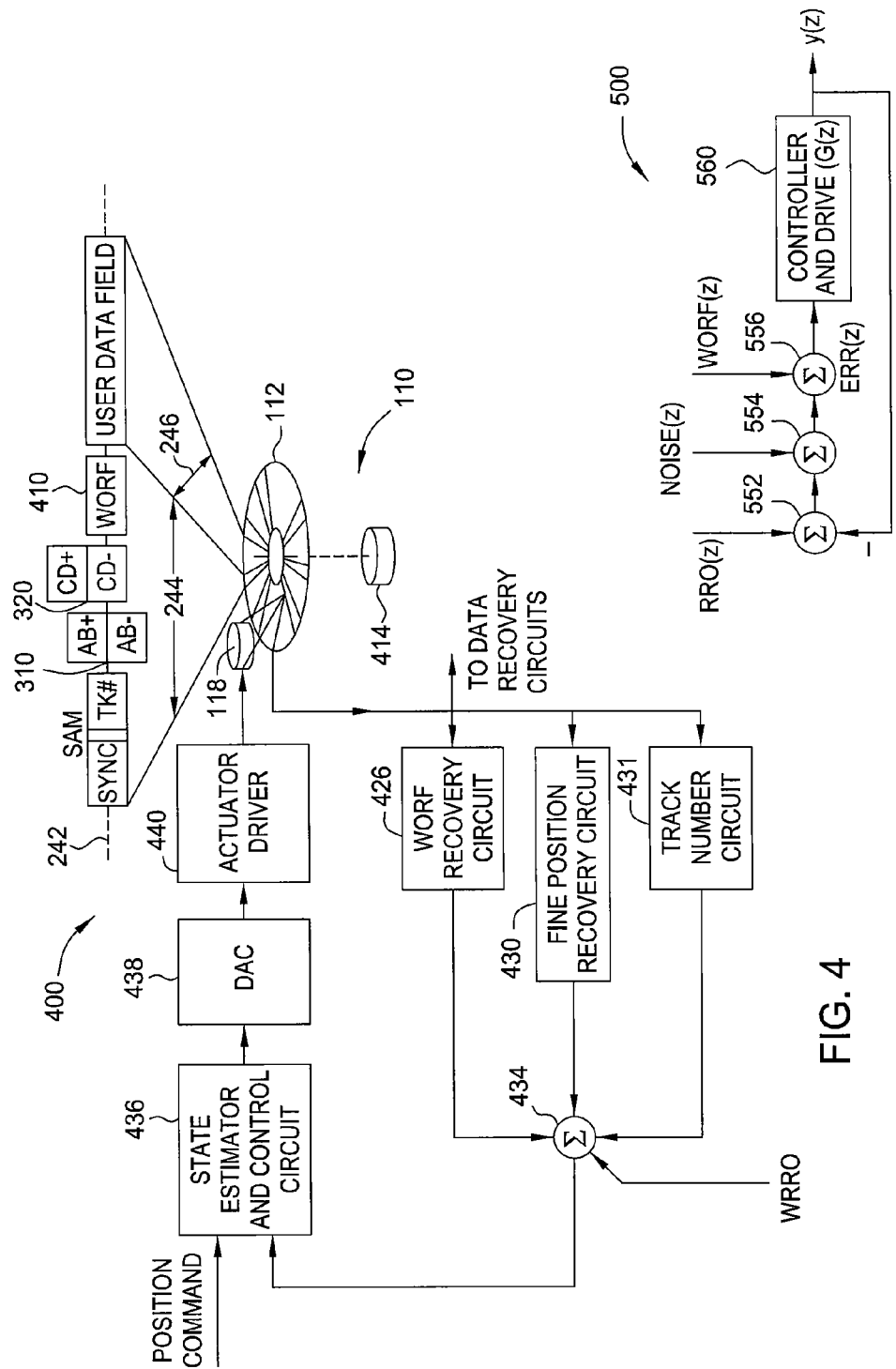

DETERMINATION OF WEDGE OFFSET CORRECTION VALUES FOR A DISK DRIVE

BACKGROUND OF THE INVENTION

1. Field of the Invention

Embodiments of the present invention relate generally to disk drives and, more particularly, to a method for iterative real-time determination of wedge offset compensation values for such drives.

2. Description of the Related Art

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo system is generally implemented. The servo system uses servo data read from a "servo wedge" on the disk surface to align the transducer with the desired track, where the servo data may include the track number as well as "servo bursts" that indicate how far the recording head is from the ideal track center line. The servo data are previously written on the disk surface by the drive itself using a self-servo-writing procedure or by an external device, such as a servo track writer (STW). In either case, an additional factory calibration for each track present on the disk drive may be required to compensate for small errors in the position of the servo bursts written on the disk surface. Because modern disk drives typically include hundreds of thousands of tracks, such factory calibration is a time-consuming part of the manufacturing process.

In an ideal disk drive, the tracks of a disk are non-perturbed circles situated about the center of the disk. As such, each ideal track includes a track centerline that is located at a known constant radius from the disk center. In practice, however, writing non-perturbed circular tracks to a disk is problematic due to imperfections in the media itself and/or in the position control of the device writing the servo bursts caused by mechanical effects, e.g., vibration, bearing defects, inaccuracies in the STW, disk clamp slippage, etc. Thus, the servo bursts that define each track are generally written with an offset from the ideal non-perturbed circular track shape. Positioning errors created by the offset between the real servo burst locations and the ideal track location are known as written-in repeatable runout (WRRO).

Without additional correction to the servo bursts as written to a disk, the non-ideal shape of the tracks as defined by the servo bursts creates two problems. First, the transducer positioning function is made more complicated during read and write operations because the servo system continuously repositions the transducer during track following to keep up with the constantly changing radius of the track centerline as defined by the servo bursts, rather than following the constant radius of an ideal circle. Second, the perturbed shape of these tracks can result in problems such as track misregistration errors during read and write operations and "track squeeze," i.e., adjacent tracks that are spaced too close together.

Disk drive manufacturers have developed techniques to measure the WRRO for each track of a disk drive and produce compensation values that allow the servo system of the disk drive to substantially ignore the offset between the desired track centerline and the actual position of the servo bursts on the disk surface. The compensation values are typically generated for each servo wedge of each track of a disk drive. A number of schemes are known in the art for producing such compensation values, but each involves controlling the transducer to follow a given track for a number of revolutions while measuring a position error signal (PES) as the transducer passes over the servo bursts. In some schemes, PES is measured over multiple revolutions of the disk, and then an average wedge offset compensation value is calculated for each servo wedge. In other schemes, the wedge offset compensation values are determined with increasing accuracy iteratively over multiple revolutions. In either case, multiple revolutions of the disk are necessary to obtain accurate compensation values for the servo bursts associated with each track, and each additional revolution needed significantly increases the time required for factory calibration of a disk drive to complete. For example, given a disk drive operating at 7200 rpm and having four disk surfaces of 150,000 tracks each, determining wedge offset compensation values for the entire disk can take over five hours when an average of four revolutions is required to obtain accurate compensation values for a single track. This time is doubled for a self-servo writing scheme. Thus, reducing the average number of revolutions per track for obtaining accurate compensation values by just one revolution (e.g., from four to three) would reduce the calibration time of a disk drive by one or more hours.

In light of the above, there is a need in the art for a method of determining wedge offset compensation values for a disk drive that can determine such compensation values in a minimum number of revolutions of a data storage disk.

SUMMARY OF THE INVENTION

One or more embodiments of the invention provide a method and a system for determining wedge offset correction values for the servo wedges of a disk drive, which are also referred to as wedge offset reduction field (WORF) values. The embodiments implement a real-time iterative approach that reduces the number of storage disk revolutions necessary to determine wedge offset correction values for a track of the disk drive. Rather than calculating wedge offset correction values using a revolution-based scheme, in which PES is measured at all servo wedges of a track for one or more revolutions and WORF values are then calculated for all servo wedges simultaneously, a wedge-based scheme is used. In the wedge-based scheme, WORF values are calculated wedge-by-wedge, based on the PES of the most recently measured servo wedge in combination with the measured PES of previous servo wedges. For a more stable WORF calculation algorithm and more accurate WORF values, an iterative scheme is used, where the WORF value for a given servo wedge is further corrected with each revolution of the storage disk.

In one embodiment, the PES of a servo wedge is measured and immediately included in the computation of an updated WORF value for the measured wedge. That WORF value is, in turn, used in the computation of the servo-control signal for that wedge. To minimize transport delay of the servo due to the computation time that takes place between sensing the PES and computing a servo-control signal, the majority of servo-control calculations are pre-calculated prior to measuring the PES at the current wedge. In a preferred embodiment, all servo-control calculations that involve the PES measured at previous servo wedges are calculated prior to measuring the PES of the current wedge, so that only the few computations involving the PES of the current wedge need to be performed after measurement of the current wedge PES. With this technique, the additional transport delay of the servo that is introduced by the use of this updated WORF value has been observed to be less than one microsecond.

In another embodiment, the PES of a servo wedge is measured and included in the computation of an updated WORF value for the next servo wedge. In such an embodiment, there is no additional delay between measurement of the PES at a servo wedge and the computation of the servo-control signal for that wedge. Pre-computing of the WORF value is not necessary in this embodiment, although it can still be employed, because an updated WORF value for the next wedge, which is based on the PES measured for each of the previous wedges, will be available long before the PES is actually measured for that wedge.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a schematic diagram of a servo system for determining the location of at least one servo burst edge in a servo wedge and producing a drive signal to an actuator driver of the disk drive.

FIG. 5 is a diagram of a discrete-time model of a disk drive.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
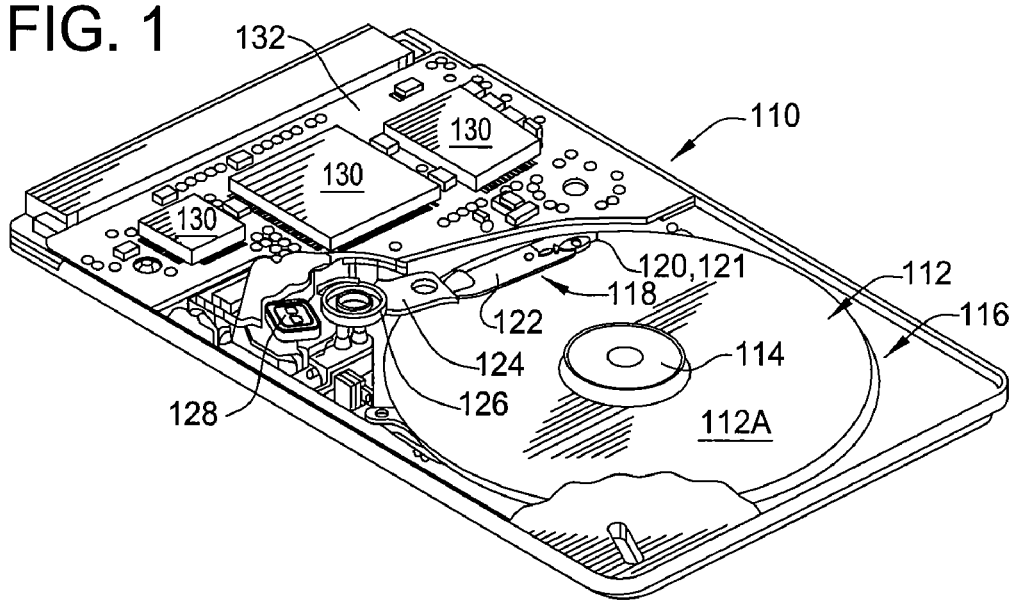
FIG. 1 is a perspective view of a disk drive that can benefit from embodiments of the invention as described herein.

FIG. 1 is a perspective view of a disk drive 110 that can benefit from embodiments of the invention as described herein. For clarity, disk drive 110 is illustrated without a top cover. Disk drive 110 includes a storage disk 112 that is rotated by a spindle motor 114. Spindle motor 114 is mounted on a base plate 116. An actuator arm assembly 118 is also mounted on base plate 116, and has a slider 120 mounted on a flexure arm 122 and includes a transducer head 121 lithographically constructed thereon. Flexure arm 122 is attached to an actuator arm 124 that rotates about a bearing assembly 126. Voice coil motor 128 moves slider 120 relative to storage disk 112, thereby positioning transducer head 121 over the desired concentric data storage track disposed on the surface 112A of storage disk 112. Spindle motor 114, transducer head 121, and voice coil motor 128 are coupled to electronic circuits 130, which are mounted on a printed circuit board 132. The electronic circuits 130 include a read channel, a microprocessor-based controller, and random access memory (RAM). For clarity of description, disk drive 110 is illustrated with a single storage disk 112 and actuator arm assembly 118. Disk drive 110, however, may also include multiple storage disks 112 and multiple actuator arm assemblies 118. In addition, each side of disk 112 may have an associated transducer head 121, both of which are collectively coupled to the rotary actuator 130 such that both transducer heads 121 pivot in unison. The invention described herein is equally applicable to devices wherein the individual heads are configured to move separately some small distance relative to the actuator. This technology is referred to as dual-stage actuation (DSA).

Figure 2A:
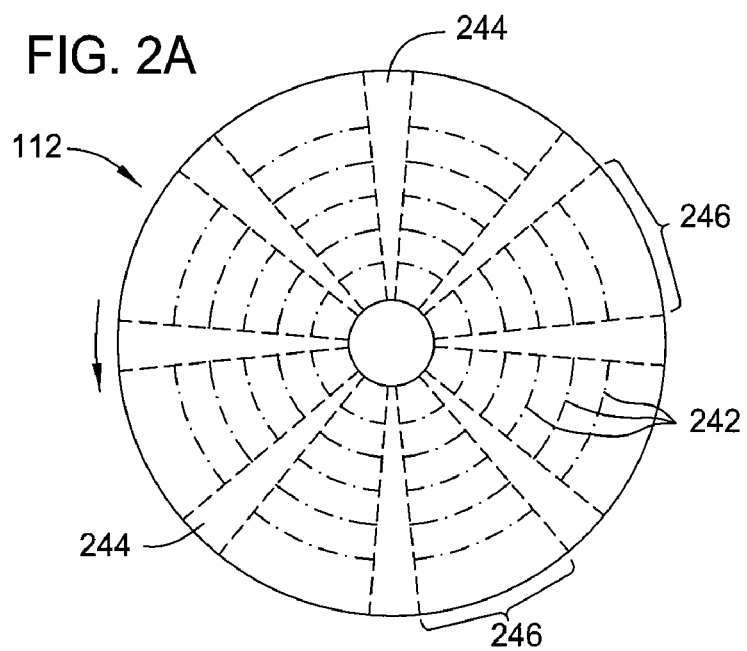
FIG. 2A illustrates storage disk with data organized in a typical manner known in the art.

FIG. 2A illustrates storage disk 112 with data organized in a typical manner known in the art. Storage disk 112 includes concentric data storage tracks 242 for storing data. Each of concentric data storage tracks 242 is schematically illustrated as a centerline. However, it should be understood that each of concentric data storage tracks 242 occupies a finite width about a corresponding centerline. Storage disk 112 includes substantially radially aligned servo wedges 244, also referred to as servo spokes, that cross concentric data storage tracks 242 and store servo information in servo sectors in concentric data storage tracks 242. Such servo information includes a reference signal, such as a square wave of known amplitude, that is read by transducer head 121 during read and write operations to position the transducer head 121 above a desired track 242. The servo information in servo wedges 244 is further detailed below in conjunction with FIG. 2B. In practice servo wedges 244 may be somewhat curved, for example, configured in a partial spiral pattern. Typically, the actual number of concentric data storage tracks 242 and servo spokes 244 included on storage disk 112 is considerably larger than illustrated in FIG. 2A.

In operation, actuator arm assembly 118 sweeps an arc between an inner diameter (ID) and an outer diameter (OD) of storage disk 112. Actuator arm assembly 118 accelerates in one angular direction when current is passed through the voice coil of voice coil motor 128 and accelerates in an opposite direction when the current is reversed, allowing for control of the position of actuator arm assembly 118 and the attached transducer head 121 with respect to the disk 112. Voice coil motor 128 is coupled with a servo system 400 (shown in FIG. 4) that uses positioning data read by transducer head 121 from disk 112 to determine the position of transducer head 121 over concentric data storage tracks 242. Servo system 400 determines an appropriate current to drive through the voice coil of voice coil motor 128, and drives said current using a current driver and associated circuitry (shown in FIG. 4).

Figure 2B:
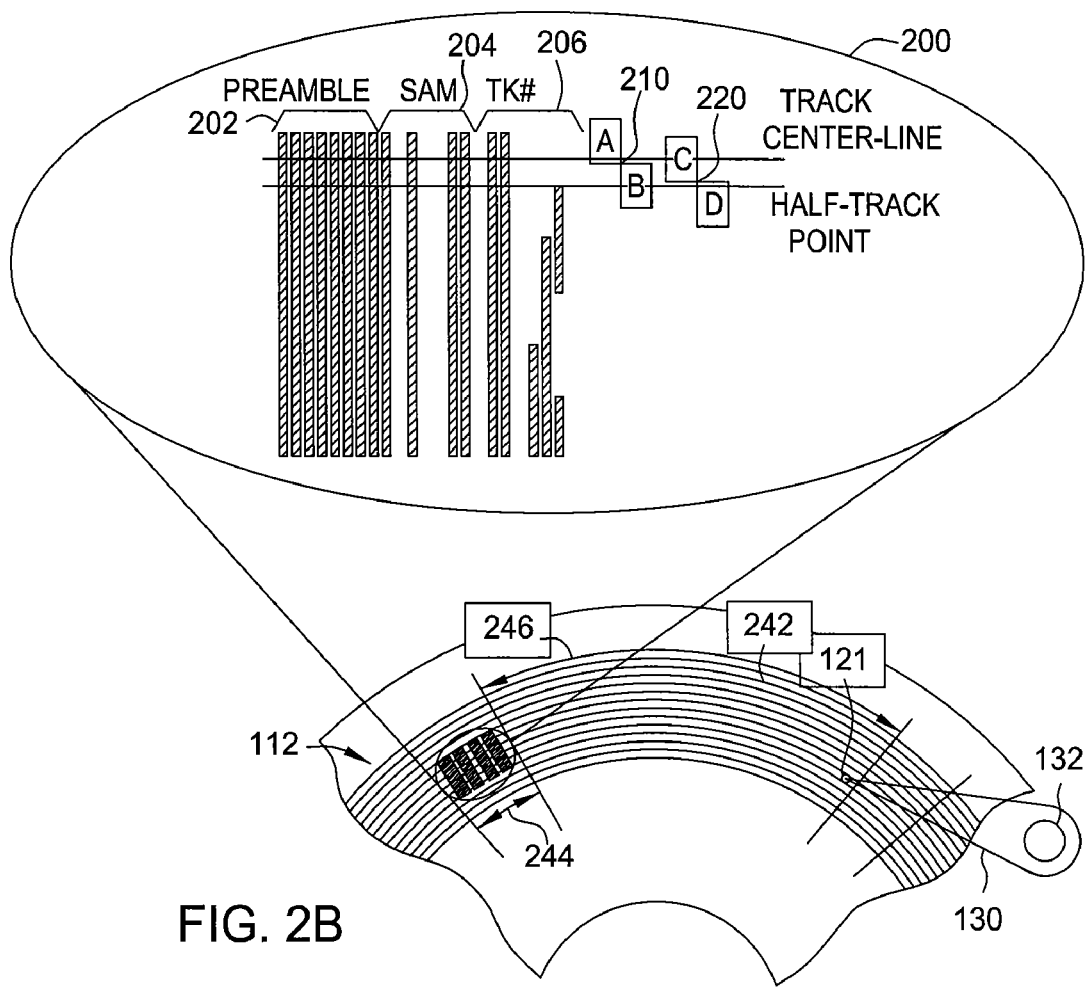
FIG. 2B schematically illustrates a portion of a storage disk having at least one servo wedge.

FIG. 2B schematically illustrates a portion of storage disk 112 having at least one servo wedge 244. Each servo wedge 244 includes information stored as regions of magnetization or other indicia, such as optical indicia. Servo wedge 244 may be longitudinally magnetized (i.e., the cross-hatched blocks of servo pattern 200 are magnetized to the left and white spaces of servo pattern 200 are magnetized to the right, or vice-versa) or perpendicularly magnetized (i.e., the cross-hatched blocks are magnetized out of the page and the white spaces are magnetized into the page, or vice-versa). Servo pattern 200 contained in each servo wedge 244 is read by transducer head 121 as the surface of the storage disk 112 passes under transducer head 121. The servo patterns 200 may include information used to identify a data sector contained in a data field 246. For example, servo pattern 200 may include digital information such as a preamble 202, a servo address mark (SAM) 204, and a track identification number 206. The servo pattern 200 also includes a set of servo bursts A, B, C, and D. As shown, there is a servo burst edge 210 between the A burst and the B burst, and a servo burst edge 220 between the C burst and the D burst. The pattern illustrated in FIG. 2B is a quadrature type pattern. In some embodiments, the servo wedge 244 may also include other information such as a wedge number. This can be a single bit to designate an index wedge (wedge #0), or the SAM may be replaced by another pattern (referred to as a servo index mark or SIM), or the wedge may contain a few low-order bits of the wedge number or a complete wedge number.

Figure 3:
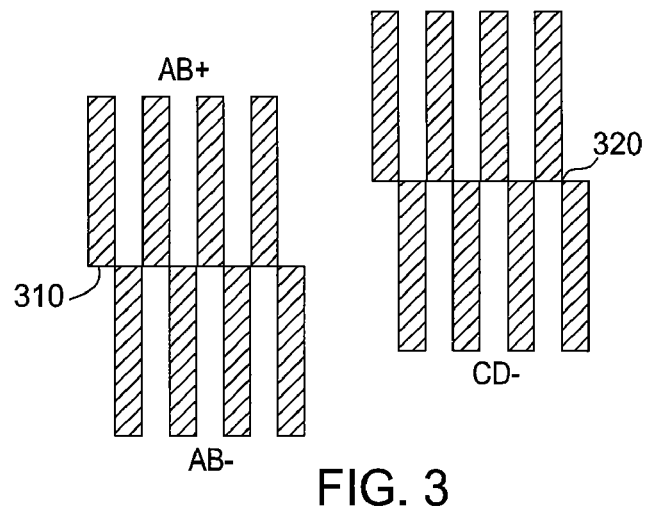
FIG. 3 illustrates a servo burst pattern that may be included in a servo pattern that is associated with a null pattern.

Servo pattern 200 may include different servo burst patterns than illustrated in FIG. 2B. For example, FIG. 3 illustrates a servo burst pattern that may be included in servo pattern 200 that is associated with a null pattern. This pattern shows four servo bursts and it should be understood that this may also be repeated in columns so as to produce several radial lines of AB+, AB−, CD+ and CD− bursts on the disk in each servo wedge 244 on the disk. Such a servo burst pattern results in a servo burst edge 310 between the AB+ and AB− servo bursts, and a servo burst edge 320 between the CD+ and CD− servo bursts in the null pattern.

In an ideal drive, one of the burst edges may be located at the center of a track or at a known distance from the center of the track. The servo pattern is read and demodulated and the distance of transducer head 121 from a selected servo burst edge is determined. A position error signal (PES) indicative of the distance from the track center or the servo burst edge is generated and used to move transducer head 121 to a position over the center of the desired track. In practice, however, the write head of the device writing the servo bursts, i.e., a servo writer, a media writer or the disk drive itself, cannot be positioned perfectly, and the servo bursts placed on the disk generally do not exactly correspond to ideal track location. Thus, there may be a significant offset between the desired position of the servo bursts and the actual position of the servo bursts written on storage disk 112, resulting in written-in runout (WRRO). WRRO can be thought of as the offset between the ideal centerline of a track and the centerline that would be determined by a transducer head reading the written servo pattern. WRRO can lead to servo performance problems, wasted space on a disk and, in a worst case, unrecoverable or irreparably damaged data.

It is desirable to determine the offset between the desired track centerline, and the apparent centerline obtained from demodulating the burst pattern, where the desired track centerline may be either a read track centerline or write track centerline. Knowing this offset at each servo wedge, all or at least a portion of the WRRO can be removed from the servo pattern as written. Such an offset value can be stored in the servo wedges for a track or in memory associated with the disk drive. The stored offset values associated with each wedge are referred to herein as WORF data or WORF values. WORF data can be, for example, a digital number placed after a servo wedge on a given track that includes an amount that should be added to, or subtracted from, the PES value for that wedge obtained from demodulating the servo bursts. Alternatively, WORF data can also be stored in memory associated with the disk drive, such as SRAM, DRAM, or flash. The WORF data can be used to compensate for the misplacement of the burst edges used to determine a track centerline. The WORF value associated with a wedge can be read and added to the value to the computed PES, so that a transducer head follows a path that more accurately tracks the ideal centerline. The WORF data may be a negative or positive value, depending on the offset of the data written in a particular servo wedge.

FIG. 4 is a schematic diagram of a servo system 400 for determining the location of at least one servo burst edge in the servo wedge 244 and producing a drive signal to an actuator driver 440 of disk drive 110, according to an embodiment of the invention. In this embodiment, storage disk 112 has a servo wedge 244 that includes a null type servo burst pattern that includes AB+, AB− burst edge 310 and CD+, CD− burst edge 320. The invention is equally applicable to disk drives that include other types of servo patterns, such as a quadrature servo pattern. Also included as part of the information contained in each servo wedge 244 is a WORF 410 for storing a correction value of the distance that AB+, AB− burst edge 310 and/or CD+, CD− burst edge 320 is from the ideal track of a concentric data storage track 242. In some embodiments, the correction value, or WORF value, may also be stored in memory such as SRAM, DRAM, or flash. In an embodiment that features quadrature type servo pattern, the WORF value will correspond to a distance from at least one of AB burst edge 210 or CD burst edge 220 (shown in FIG. 2B). Storage disk 112 includes a plurality of concentric data storage tracks 242, each of which includes a plurality of servo wedges 244 and data fields 246.

The actuator arm assembly 118 is driven by an actuator driver 440. The actuator driver 440 delivers current to voice coil motor 128 shown in FIG. 1. In operation, minute electrical signals induced from recorded magnetic flux transitions are amplified by a preamplifier 424 and then delivered to conventional disk drive data recovery circuits (not shown). Disk drive 110 includes a servo system 400 that is used to determine the location of a transducer. The servo system 400 is a feedback loop that measures the position of transducer head 121 and produces a drive current that is input to the voice coil motor of actuator arm assembly 118 to drive and position transducer head 121 over a desired track. Servo system 400 includes a recovery WORF circuit 426, a fine position recovery circuit 430, and a track number circuit 431. A signal is produced by transducer head 121 and is processed by fine position recovery circuit 430 and track number circuit 431. The output signals of fine position recovery circuit 430 and track number circuit 431 are summed at a summing node 434 and corrected with at least one of the WORF values associated with AB+, AB− burst 310 and/or CD+, CD− burst value 320. The WORF value originates from WORF recovery circuit 426, which recovers a digital burst correction value, or WORF value, from the WORF field 410 in servo wedge 244 of the disk 112. In addition, the WRRO is schematically shown to be added to the position signal at summing node 434, since that is the effect of WRRO on the servo. In order to produce a drive current at the actuator driver 440, the controller circuit 436 receives the signal from summing node 434 and head position command values from other circuitry within the disk drive 110, and combines the command values with the quantized and corrected head position values to produce a commanded actuator current value. This commanded current value is calculated by controller circuit 436, converted into an analog value by a digital to analog converter 438, and applied to control an actuator driver circuit 440, which operates the rotary actuator 118 to adjust the position of the head relative to the concentric data storage track 242 being followed.

FIG. 5 is a diagram of a discrete-time model 500 of disk drive 110, according to an embodiment of the invention. In FIG. 5, disk drive 110 and its on-board head position servo controller 436 and associated circuitry, is modeled as a discrete time dynamic system G(z) within block 560. In this exemplary model 500, z represents the discrete-time time advance operator, as is commonly used to transform continuous time systems to discrete time systems, and the Z-transform of the sampled time series rro(n) is represented as RRO (z), where rro(n) represents the repeatable run-out at servo wedge n. The dynamic system is subjected to an unknown repeated disturbance RRO(z) added at a summing node 552. Another unknown disturbance Noise(z), which is assumed zero mean noise, is added at a summing node 554 to the head position signal. Finally, a specified correction signal WORF (z) is added to the disturbed head position signal at a summing node 556. These three influences produce a combined influence ERR(z) which is the error term that drives the model 500. The resulting closed-loop transfer function may be defined as:

$$ERR(z)=WORF(z)+Noise(z)+RRO(z)-G(z)\cdot ERR(z)$$

which may be rearranged as:

$$WORF(z)+Noise(z)+RRO(z)=ERR(z)\cdot[1+G(z)]$$

The RRO signal is, by definition, periodic. Because it is periodic, it is discrete in the frequency domain and can be represented as a finite length z-polynomial. Since it repeats with every revolution of the disk spindle, it can be expressed as a summation of the various harmonics of the spindle. In fact, the only parts of rro(n) that exist are those that occur at $\omega_i$, i=0 to N/2, where N is the number of servo position samples per revolution. Since G(z) is a linear system excited by a periodic signal rro(n), the only parts of G(z) of interest are those at each $\omega_i$. The whole system is treated as a summation of discrete systems, each operating at $\omega_i$, and solved individually.

For a given $\omega_i$, WORF(j$\omega_i$) can be calculated. By measuring ERRO(j$\omega_i$) via discrete Fourier transform (DFT) or similar method, and knowing 1+G(j$\omega_i$), we calculate RRO(j$\omega_i$) from:

$$WORF(j\omega_i)+Noise(j\omega_i)+RRO(j\omega_i)=ERR(j\omega_i)\cdot[1+G(j\omega_i)]$$

The process of taking DFTs of err(n) at each $\omega_i$ (where err(n) represents the position error at servo wedge n) and scaling each by the corresponding 1+G(j$\omega_i$) is the same as convolving err(n) with a kernel made from the response of 1+G(z) evaluated at each $\omega_i$. Thus, we convolve the signal err(n) with the kernel to yield:

$$worf(n)+noise(n)+rro(n)=err(n)\otimes kernel(n)$$

where n is a variable representing servo wedges from 0 to N−1, ⊗represents the convolution operator and the kernel is a series of N numbers that represents the loop transfer function, N being the number of servo wedges per revolution. The kernel may be derived for each different disk drive model, either by control system simulation or by injecting identification signals into the servo control loop and measuring responses to those signals. In some embodiments, a separate kernel can be determined for each individual drive during the post-assembly manufacturing process steps. Alternatively, a separate kernel may be determined for each head, or multiple kernels for each head, one for each of a multiple of radial zones on each head.

In accordance with principles and aspects of the present invention, the impact of the zero mean noise term, noise(n) may be minimized by synchronously averaging, or low pass filtering with an asymptotically decreasing time constant, either err(n), or err(n)−worf(n), for multiple revolutions of the storage disk. The number of revolutions necessary is dependent upon the frequency content of the noise(n) term. A noise (n) having significant spectra near the spindle harmonics will require more revolutions of data filtering to sufficiently differentiate the spectra of rro(n) from noise(n). In the presence of sufficient filtering, noise(n) becomes small and the left side of the above equation reduces to:

$$worf(n)+rro(n)$$

which is the error between our calculated WORF values and the RRO values themselves. This format lends itself to an iterative solution:

$$worf(n)_0=0;$$

$$worf(n)_{k+1}=worf(n)_k+\alpha_k\cdot err(n)_k\otimes kernel(n)$$

where k is the iteration number and $\alpha_k$ is a constant between zero and unity selected to yield a convergence rate that is forgiving to mismatches between the actual transfer function and that used to generate the kernel. In one embodiment, the value of $\alpha_k$ could vary from iteration to iteration. In yet another embodiment, the value of $\alpha_k$ could vary as a function of the rate of reduction in correction to WRRO for a particular wedge. One of skill in the art will readily appreciate that the value of $\alpha_k$ is important to the convergence of an iterative WORF value determination scheme: if too high, convergence to accurate WORF values is slowed or never properly reached, if too low, the WORF determination algorithm may become very slow or not converge at all. For example, a relatively high gain may, i.e., where $0.5\leq\alpha_k<1.0$, may be used for early iterations and then gradually reduced during subsequent iterations. In sum, the WORF value for an individual servo wedge n can be computed as a circular convolution, denoted as CONVi(n), of the PES for the previous revolution of the disk media using the inverse transfer function of the servo loop, where PES values for each servo wedge are stored in a circular buffer and a gain factor $\alpha_k$ is used to enhance reliable convergence.

For a particular track, the WORF value, i.e., the offset correction value, for each wedge on the storage disk is determined in real time on a per-wedge basis and immediately included in the computation of the servo-control signal for the measured wedge. With each revolution of the storage disk, an additional iteration k is performed on each servo wedge, and the WORF value for each of the N wedges is corrected. Because the servo-control signal is calculated based on the most up-to-date position information for the transducer head, i.e., the most recently measured PES, accurate WORF values are determined in a relatively small number of revolutions of the storage disk compared to prior art methods of determining WORF values. A disk drive controller or microprocessor can be dedicated to read and demodulate the servo pattern and produce a PES, or a portion of the controller or microprocessor can be used to perform these servo operations.

One of skill in the art will appreciate that the number of calculations required to perform the convolution of the inverse transfer function kernel of N terms with the WORF and PES terms of the previous revolution includes N multiplies and N accumulates, which necessitate a significant computation time for the disk drive controller or microprocessor to complete. Because the number of servo wedges N on a storage disk can be on the order of 100-200, the transport delay introduced by waiting for the computation of an updated WORF value based on the most recently measured PES can be significant. Embodiments of the invention contemplate pre-calculating the majority of WORF value determination calculations and servo-control calculations for the current servo wedge prior to measurement of the PES for the current wedge. Namely, all multiplies and accumulates that make up the convolution of the inverse transfer function kernel with the WORF and PES terms for all previously measured servo wedges may be performed and saved prior to measuring the PES of the current wedge. Computation of the final multiply and accumulate of the convolution operation are performed after measuring the PES for the current wedge. In this way, only a small number of operations are performed by the disk drive controller or microprocessor after the PES of the current wedge has been measured: one retrieval from memory, one multiply, and one accumulate. This small number of operations can be performed significantly faster than one microsecond. Thus, the additional transport delay of the servo that is introduced by the WORF value computation is minimal even though the most up-to-date PES is incorporated into the servo-control signal for the transducer head.

Figure 6:
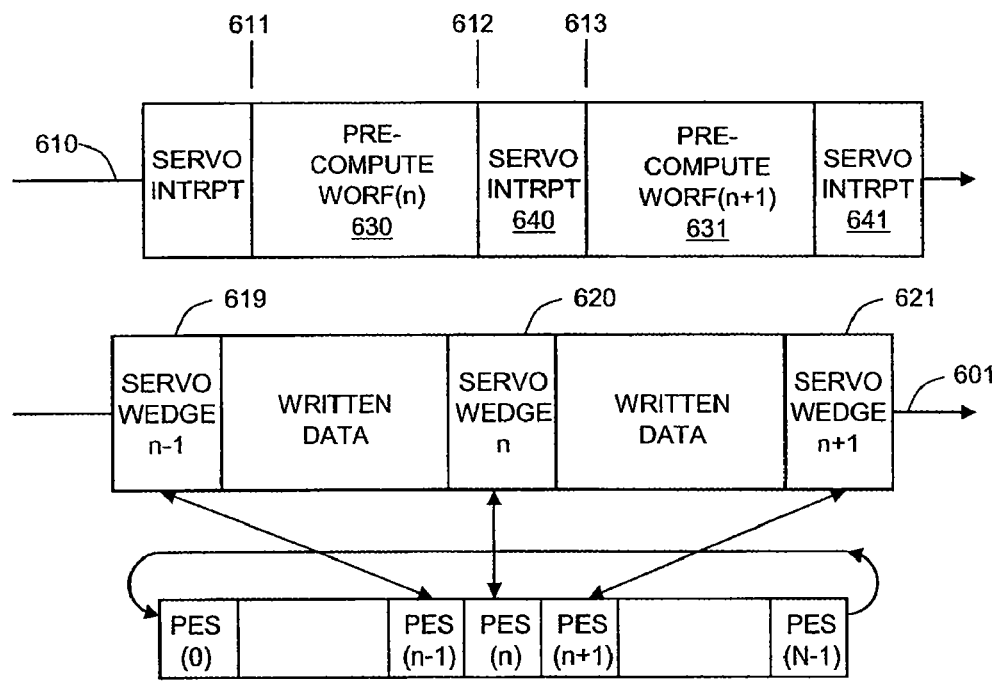
FIG. 6 is a schematic diagram showing the relative position of servo wedges and written data on a track of the disk media and a corresponding time domain sequence for performing a wedge offset value correction procedure as a transducer head travels over the disk media.

FIG. 6 is a schematic diagram showing the relative position of servo wedges and written data on a track 601 of the disk media and a corresponding time domain sequence 610 for performing a WORF value correction procedure as a transducer head travels over the disk media.

Between times 611 and 612, when the transducer head is positioned between servo wedges 619 and 620, the disk drive controller conducts a pre-compute 630 of the WORF value for servo wedge 620, which is also labeled as servo wedge n, where n goes from 0 to N−1 and N is the number of servo wedges. Pre-compute 630 includes performing a circular convolution of the inverse transfer function of the servo loop and the PES for all servo wedges except servo wedge 620. Specifically, the PES values used for this computation include the PES for servo wedges n+1 through N−1 of the previous revolution of the disk media and the PES for servo wedges 0 through n−1 of the current revolution of the disk media.

At time 612, the transducer head encounters servo wedge 620 and reads the servo pattern. The disk drive controller then demodulates the servo pattern and produces the PES for servo wedge 620 during a servo interrupt 640. In addition, the disk drive controller completes the final operations of the circular convolution of the inverse transfer function of the servo loop and the PES for all servo wedges by performing the final multiply and accumulate of the PES for servo wedge 620. By completing the circular convolution of these two functions, a corrected WORF value for servo wedge 620 is generated and applied to the transducer position to produce a substantially circular track. Since the final operations required to complete the circular convolution can be carried out on the order of 10s of nanoseconds, servo interrupt 640, which may require up to 10 microseconds or more to complete all required functions thereof, undergoes no significant increase in duration. Specifically, the time between the measurement of the PES for servo wedge 620 and the application of the servo control signal in response to that PES is only increased on the order of 10s of nanoseconds as the final operations of the circular convolution of the inverse transfer function of the servo loop and the PES for all servo wedges are completed. Hence, the end of the time-critical portion of the servo interrupt 640, i.e., time 613, occurs a very short time after the transducer has passed over servo wedge 620, and only a fraction of a microsecond later than if the PES for servo wedge 620 were not incorporated into the WORF value used during servo interrupt 640. As shown, the PES of servo wedge 620 has been incorporated into the servo-control signal quickly enough to influence the path of the transducer head for most of the time the transducer head travels between servo wedges 620 and 621. In contrast, a revolution-based scheme for calculating WORF values incorporates a delay from observation of a servo wedge PES to application of the WORF value correction based on the observed PES that can be one or more complete revolutions of the disk media in duration. Consequently, the real-time, wedge-based method for determining WORF values described herein can more quickly converge to accurate WORF values for a given track than a revolution-based scheme for calculating WORF values.

At time 613, the process started at time 611 for servo wedge n is repeated for servo wedge n+1. Namely, the disk drive controller conducts a pre-compute 631 of the WORF value for the next servo wedge 621, where the procedure followed in pre-compute 631 is substantially similar to that in pre-compute 630. This time domain sequence for correcting WORF values for each servo wedge of track 601 of the disk media repeats for multiple revolutions of the disk media, until a desired final condition is met. In one embodiment, the final condition may be based on the total number of servo wedges from the start of the procedure whose WORF values have been updated. In another embodiment, the WORF value correction procedure may be terminated for a given track after a desired level or ratio of WRRO reduction is achieved. Other termination criteria are also contemplated. In one embodiment, the WORF value correction procedure may be performed periodically throughout the lifetime of the disk drive or as part of a data recovery technique.

For the WORF value correction procedure described herein, non-zero starting conditions for the WORF values are desirable for a stable and quickly converging process. In one embodiment, the starting conditions for the WORF values of a given track are taken to be the WORF values determined for the previous track. In such an embodiment, the WORF values for the very first track of a storage disk may be determined using any method currently known in the art, such as a revolution-based WORF value correction scheme or other procedure. In another embodiment, instead of inputting "best guess" starting conditions, stability of the iterative real-time WORF value determination scheme described herein can be improved by reducing the gain of the servo loop significantly, e.g., by a factor of four or more, or the PES value of each servo wedge can be substantially discounted, e.g., 70%, on the first or on all revolutions for a given track. Alternatively, the gain reduction and/or PES discount techniques may only be applied to the first track measured on a disk media.

Figure 7:
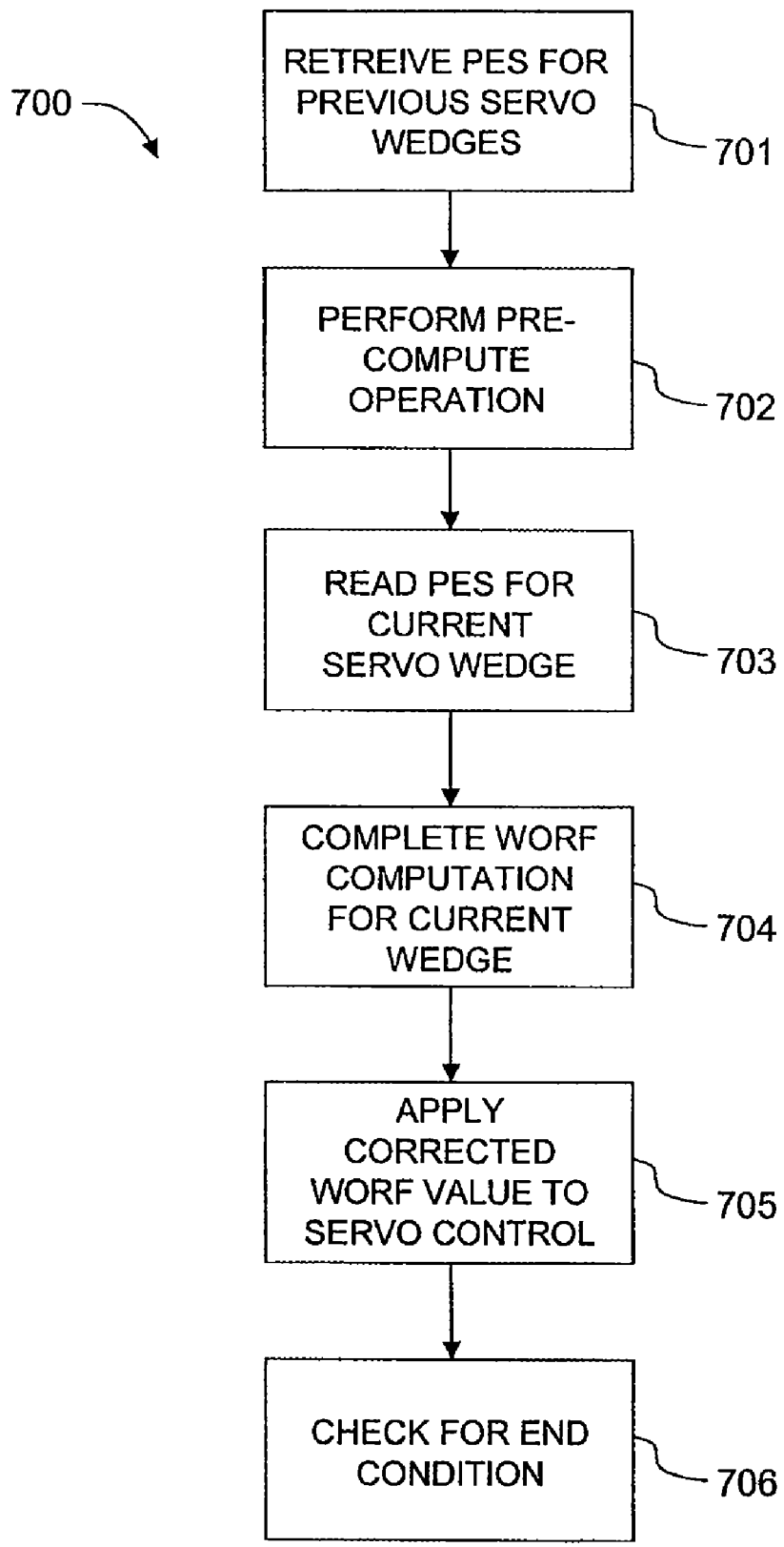
FIG. 7 is a flow chart summarizing a method of determining wedge offset value corrections in a disk drive, using a real-time per wedge scheme.

FIG. 7 is a flow chart summarizing a method 700 of determining WORF value corrections in a disk drive, using a real-time per wedge scheme, according to an embodiment of the invention. For ease of description, method 700 is described in terms of a disk drive substantially similar to disk drive 110 in FIG. 1, however other disk drives may also benefit from the use of method 700. The commands for carrying out steps 701-706 may reside in the disk drive control algorithm and/or as values stored in the electronic circuits of the disk drive or on the storage disk itself. As described above in conjunction with FIG. 6, initial WORF values for the first revolution of the disk media may be provided by a number of different procedures.

In step 701, as transducer head 121 passes over data sectors 246 of storage disk 112, the controller circuit 436 retrieves from memory the PES for previous servo wedges. In one embodiment, the PES values for each servo wedge are stored in a circular buffer and may be over-written with each revolution of storage disk 112. The PES values may be retrieved for all previous servo wedges except for the next servo wedge to be measured, i.e., servo wedge n.

In step 702, controller circuit 436 performs the pre-compute operation, in which all operations that make up the convolution of the inverse transfer function kernel with the WORF and PES terms for previously measured servo wedges up to servo wedge n−1 are performed and saved.

In step 703, transducer head 121 passes over servo wedge n, generating a PES that is demodulated and saved by controller circuit 436.

In step 704, controller circuit 436 completes the WORF value determination for servo wedge n by performing the final operations of the circular convolution of the inverse transfer function with the PES for previously measured wedges. The final operations include the multiply and accumulates that include the PES for servo wedge n.

In step 705, controller circuit 436 applies the corrected WORF value for servo wedge n to the servo control signal.

In step 706, an end-condition check is made. The end condition for method 700 may be a desired level of WRRO reduction or a ratio of WRRO reduction that has been achieved for one or more servo wedges between successive revolutions of the disk media. Alternatively, the end condition for method 700 may be a pre-determined number of servo wedges and/or revolutions of the disk media on which method 700 has been performed. Other termination criteria are also contemplated. If the end condition is not met, method 700 is repeated for servo wedge n+1. If the end condition is determined to be satisfied, the WORF value for each servo wedge of the current track is written to the appropriate WORF on the disk media and/or stored in other memory associated with the disk drive, such as SRAM, DRAM, or flash. In one embodiment, the final WORF values for the track are stored prior to the transducer moving to the next track of the disk media.

Using the WORF value determination procedure of method 700, the WORF values for each servo wedge on a track is computed using the same set of steps. Unlike a revolution-based WORF value determination scheme, there are no distinct data collection and data processing stages in the WORF computation procedure or method 700. This allows simpler and smaller lines of code implementation and does not require a WORF value processing state machine running in the background. Such a WORF value determination scheme is naturally implemented in real time in the servo interrupt routine.

Figure 8:
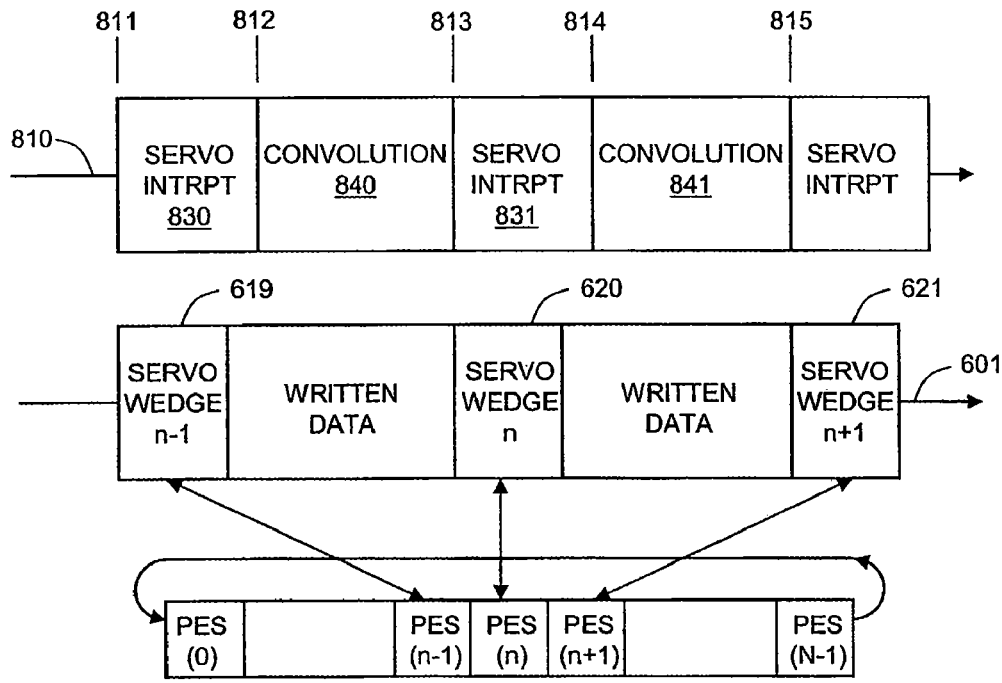
FIG. 8 is a schematic diagram showing the relative position of servo wedges and written data on a track of the disk media and a corresponding time domain sequence for performing a wedge offset value correction procedure as a transducer head travels over the disk media.

In an alternative embodiment, the PES of a servo wedge is measured and included in the computation of an updated WORF value for the next servo wedge to be measured. Such a WORF value determination scheme is illustrated in FIG. 8. FIG. 8 is a schematic diagram showing the relative position of servo wedges and written data on a track 601 of the disk media and a corresponding time domain sequence 810 for performing a WORF value correction procedure as a transducer head travels over the disk media, according to an example embodiment.

At time 811, the transducer head encounters servo wedge 619 and reads the servo pattern. The disk drive controller then demodulates the servo pattern and produces the PES for servo wedge 619 during a servo interrupt 830.

At time 812, as part of servo interrupt 830, the disk drive controller produces a servo control signal to re-position the transducer head as the transducer head travels between servo wedge 619 and servo wedge 620. The servo control signal is based on the PES measured for servo wedge 619 and a previously calculated WORF value for servo wedge 619. In such an embodiment of the invention, the PES for servo wedge 619 measured at time 811 is not used to update the WORF value for wedge 619. Also at time 812, the disk drive controller begins calculating the WORF value for the next servo wedge, i.e., servo wedge 620, by performing a circular convolution 840 of the inverse transfer function of the servo loop and the PES for all servo wedges. The PES values used for this computation include the most recently measured PES values available. Thus, with servo wedge 620 defined as servo wedge n from a total of N servo wedges located on a given track, the PES values used for this computation include the PES for servo wedges 0 to n−1 for the current revolution of the disk media and the PES for servo wedges n to N−1 for the previous revolution of the disk media. The new WORF value for servo wedge 620, i.e., servo wedge n, is calculated before time 813, and will be applied to the servo control signal in a servo interrupt 831 that occurs when the transducer head encounters servo wedge 620.

At time 813, the transducer head encounters servo wedge 620 and reads the servo pattern. The disk drive controller then demodulates the servo pattern and produces the PES for servo wedge 620 during servo interrupt 831. The above process is then repeated for each following servo wedge, where the WORF value for a given wedge is calculated prior to measuring the PES value at that wedge. For example, the WORF value for servo wedge 621 is computed between times 814 and 815 during circular convolution 841. In this way, no PES data older than one revolution of the disk media are used to compute a WORF value for any servo wedge. As a result, this method enables relatively fast convergence to accurate WORF values for a disk media compared to revolution-based and other WORF value determination schemes known in the art.

Figure 9:
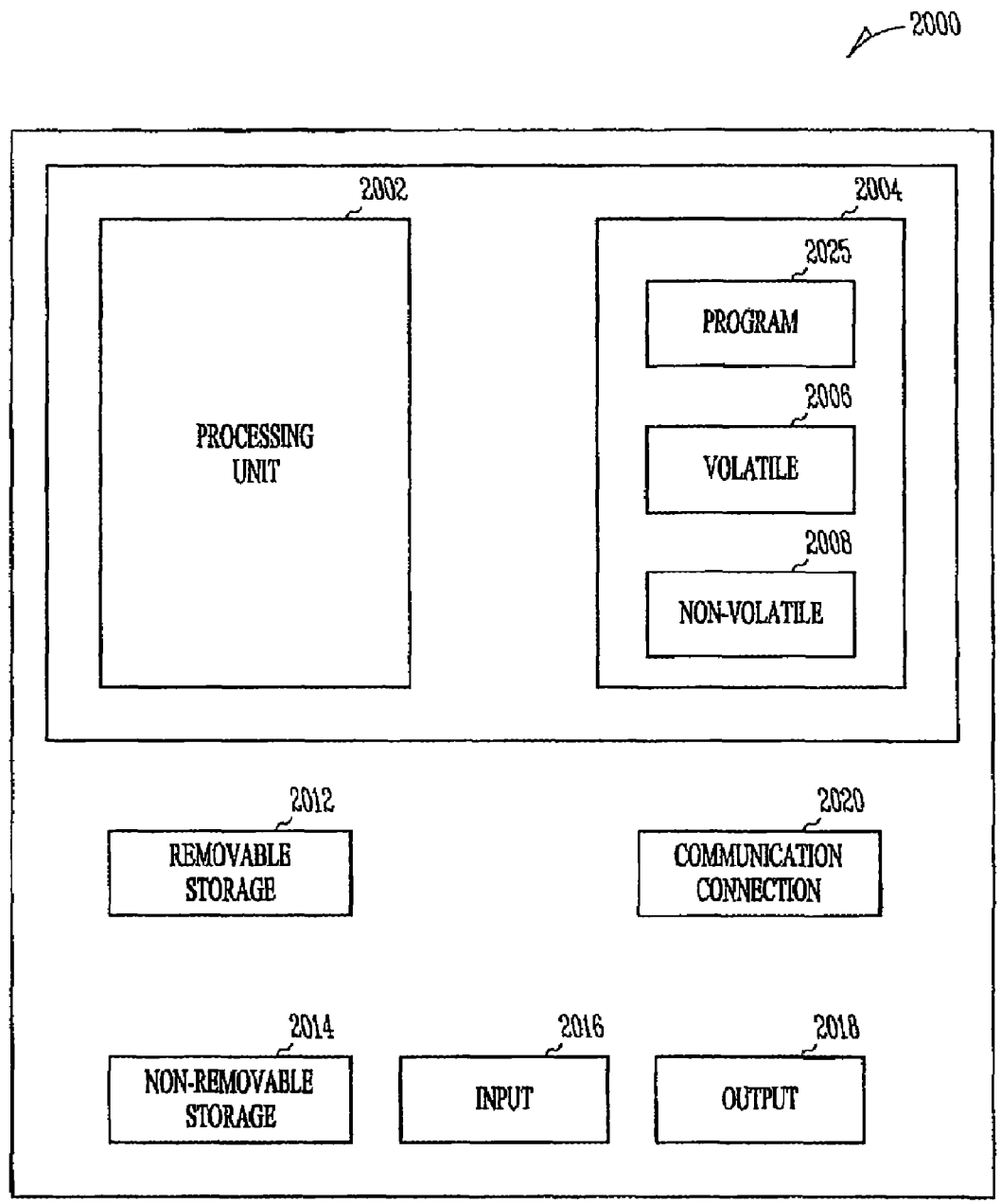
FIG. 9 is a block diagram of a computer system that executes computer program instructions for performing a method of determining wedge offset value corrections in a disk drive.

FIG. 9 is a block diagram of a computer system 2000 that executes computer program instructions for performing a method of determining wedge offset value corrections in a disk drive. Computer system 2000 includes a processing unit 2002, memory 2004, removable storage 2012, and non-removable storage 2014. Memory 2004 may include volatile memory 2006 and non-volatile memory 2008. Computer system 2000 may include, or have access to a computing environment that includes, a variety of computer-readable media, such as volatile memory 2006 and non-volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer system 2000 may include or have access to a computing environment that includes input 2016, output 2018, and a communication connection 2020. One of the inputs could be a keyboard, a mouse, or other selection device. The communication connection 2020 can also include a graphical user interface, such as a display. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executed by the processing unit 2002 of the computer system 2000. A hard drive, CD-ROM, and RAM are some examples of articles including a computer-readable medium. For example, a computer program 2025 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 2000 to provide generic access controls in a COM based computer network system having multiple users and servers.

A machine-readable medium, such as discussed above, provides instructions that, when executed by a machine, cause the machine to demodulate servo information for a first servo wedge, and determine a correction factor for a WRRO for the servo information for the first servo wedge before demodulating servo information for a second servo wedge. The second servo wedge is next in time with respect to the first servo wedge. In some embodiments, the instructions, when executed by a machine, further cause the machine to add the determined correction factor for the first servo wedge to a PES for a first servo wedge. The PES results from demodulating the servo information for the first servo wedge. In some embodiments, the instructions cause the machine to store the determined correction factor for the first wedge of servo information. The machine readable medium may also cause the machine to retrieve a plurality of PES values associated with each of a plurality of servo wedges associated with a track on a disk surface of a disk drive, and perform a convolution of the retrieved PES values from each of the plurality of servo wedges as part of determining the correction value. The machine-readable medium also may include instructions to cause the machine to add the determined correction factor for the first wedge of servo information to a PES value for the first wedge of servo information. The machine may then be instructed to produce a current in a voice coil motor of the disk drive to move a transducer to a position over a selected track on a disk.

While the foregoing is directed to embodiments of the present invention, other and further embodiments of the invention may be devised without departing from the basic scope thereof, and the scope thereof is determined by the claims that follow.

We claim:

1. In a disk drive that has a recording medium configured with a plurality of servo wedges, a method for generating a servo control signal for a transducer head of the disk drive after the transducer passes over a current servo wedge but before the transducer head passes over the next servo wedge, comprising the steps of:
   computing an interim result using one or more position error signals associated with at least one servo wedge other than the current servo wedge;
   measuring a position error signal associated with the current servo wedge;
   determining a correction factor for the position error signal associated with the current servo wedge based on the interim result and said position error signal associated with the current servo wedge; and
   applying the correction factor to the position error signal associated with the current servo wedge; and
   generating the servo control signal for the current servo wedge after the correction factor is applied to the position error signal associated with the current servo wedge.

2. The method according to claim 1, wherein there are M servo wedges and one position error signal and one correction factor stored for each of the M servo wedges.

3. The method according to claim 2, wherein the correction factor is determined based on the position error signals and the correction factors associated with all of the servo wedges other than the current servo wedge and the measured position error signal associated with the current servo wedge.

4. The method according to claim 3, further comprising:
   updating the position error signal stored for the current servo wedge with the measured position error signal; and
   updating the correction factor stored for the current servo wedge with the newly determined correction factor.

5. The method according to claim 1, wherein a portion of the correction factor for the servo control signal is determined before the position error signal associated with the current servo wedge is measured.

6. The method according to claim 5, wherein the portion of the correction factor for the servo control signal is determined from said one or more position error signals associated with at least one servo wedge other than the current servo wedge.

7. The method according to claim 5, wherein the portion of the correction factor for the servo control signal is determined from said one or more position error signals associated with all of the servo wedges other than the current servo wedge.

8. In a disk drive that has a recording medium configured with a plurality of servo wedges #0 to #M−1, a method for generating a servo control signal for a transducer head of the disk drive, comprising the steps of:
   measuring a position error signal of servo wedge #n and storing the measured position error signal; and
   before the transducer head reaches servo wedge #n+1, retrieving stored position error signals associated with all M servo wedges, determining a correction factor for the servo control signal based on the stored position error signals, and applying the correction factor to the servo control signal.

9. The method according to claim 8, wherein one position error signal and one correction factor are stored for each of the M servo wedges.

10. The method according to claim 9, wherein the correction factor is determined based on the stored position error signals and the stored correction factors.

11. The method according to claim 10, further comprising steps of:
   measuring a position error signal of servo wedge #n+1 and updating the stored position error signal for servo wedge #n+1 with the measured position error signal; and
   updating the correction factor for servo wedge #n+1 with the newly determined correction factor.

12. The method according to claim 8, further comprising steps of:
   measuring a position error signal of servo wedge #n+1 and updating the stored position error signal for servo wedge #n+1 with the measured position error signal; and
   before the transducer head reaches servo wedge #n+2, retrieving stored position error signals associated with all M servo wedges, determining a correction factor for the servo control signal based on the stored position error signals, and applying the correction factor to the servo control signal.

13. The method according to claim 12, wherein one position error signal and one correction factor are stored for each of the M servo wedges.

14. The method according to claim 13, wherein the correction factor is determined based on the stored position error signals and the stored correction factors.

15. A method for iteratively determining correction factors used in generating servo control signals for a transducer head of a disk drive that has a recording medium configured with M servo wedges (M>1), comprising the steps of:
   storing a set of M correction factors, one for each of the servo wedges;
   rotating the recording medium;
   during each revolution of the recording medium, updating the M correction factors, wherein the updating for each and every servo wedge #n, where n=0 to M−1, is based on position error signals of servo wedges including position error signals of servo wedges #0 to #n−1 of the current revolution and position error signals of servo wedges #n+1 to #M−1 of the prior revolution and excluding a position error signal of wedge #n; and
   writing the updated M correction factors onto the recording medium.

16. The method according to claim 15, wherein the updating for each and every servo wedge #n includes computing a portion of the correction factor that is based on position error signals of servo wedges #0 to #n−1 of the current revolution and position error signals of servo wedges #n+1 to #M−1 of the prior revolution before a position error signal of the servo wedge #n is measured.

17. The method according to claim 16, wherein the updating for any servo wedge #n includes:
   measuring the position error signal of the servo wedge #n; and
   applying the position error signal of the servo wedge #n to the correction factor for the servo wedge #n.

18. The method according to claim 15, wherein the updating for each and every servo wedge #n is further based on correction factors of servo wedges #0 to #n−1 of the current revolution and correction factors of servo wedges #n+1 to #M−1 of the prior revolution.

19. The method according to claim 15, wherein the updating for each and every servo wedge #n is based on position error signals of servo wedges #0 to #n−1 of the current revolution and position error signals of servo wedges #n to #M−1 of the prior revolution.

20. The method according to claim 19, wherein the updating for each and every servo wedge #n is further based on correction factors of servo wedges #0 to #n−1 of the current revolution and correction factors of servo wedges #n to #M−1 of the prior revolution.

* * * * *